3,119,799
POLYMERS OF ACETYLENIC HYDROCARBONS AND METHODS FOR PRODUCING THE SAME

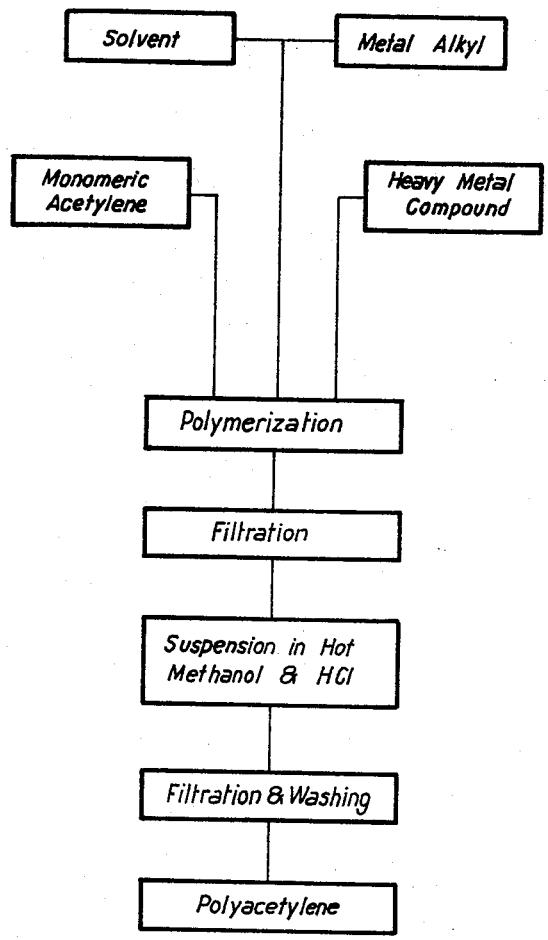

Giulio Natta, Piero Pino, and Giorgio Mazzanti, Milan, Italy, assignors to Montecatini, Societa Generale per l'Industria Mineraria e Chimica, Milan, Italy
Filed Mar. 12, 1956, Ser. No. 570,962
Claims priority, application Italy Mar. 18, 1955
20 Claims. (Cl. 260—94.1)

This invention relates to polymers of acetylenic hydrocarbons of the formula $$CH \equiv CR$$

wherein R is hydrogen or a saturated hydrocarbon, i.e. an alkyl or aryl group, and to processes for producing the polymers.

The object of the invention is to provide high polymers of the hydrocarbons of the acetylene series having the formula given, which polymers have a molecular weight above 1000, contain linear chains or long linear sections of carbon atom chains and which are, with the exception of the higher molecular weight polymers of acetylene, completely soluble in various organic solvents.

The production of low polymers of acetylene and other acetylenic hydrocarbons has been studied extensively in the past. For example, the production of vinylacetylene, benzene and cyclooctatetraene from acetylene is known. Also, it is known that acetylene can be polymerized in the presence of spongy copper to the cork-like insoluble tridimensional high polymer, cuprene.

However, high polymers that is, polymers of molecular weight above 1000 and made up of or comprising a high proportion of linear chains have not heretofore been obtained from these acetylenic hydrocarbons.

Such high polymers are obtained by the practice of this invention in accordance with which polymerization of the acetylenic hydrocarbon is effected with the aid of a polymerization agent or catalyst which is very different from the catalysts normally used in the past for cationic polymerization (of the Friedel and Crafts type) and from those used for the polymerization processes taking place through the formation of free radicals; i.e., with the aid of catalysts of the free radical or ionic type.

It is found, in accordance with the invention, that the particular type of polymerization which yields soluble high polymers of the hydrocarbons $CH \equiv CR$ takes place only when there is used a polymerization aid containing a compound of a transition metal belonging to the 4th to 8th groups of the periodic table and, at least at the surface, alkyl or alkenyl groups directly bound to metal atoms.

The polymerization aids can be obtained by reacting compounds of the transition metals with catalytic metallo-organic compounds.

By transition metals we mean the metals described and discussed as such at pages 103-106 and in chaper 20 of "Inorganic Chemistry," by T. Moeller, published by Wiley & Sons, New York, 1952.

Compounds of the transition metals which may be used are, preferably, the halides or other highly reactive compounds such as the alcoholates of the metals derived from aliphatic alcohols containing for instance up to 12 carbon atoms.

Typical compounds of the transition metals include titanium trichloride, titanium tetrachloride, vanadium tetrachloride, the alcoholates such as titanium tetrabutylate, titanium tetraisopropylate, vanadyl isopropylate, and so on, and the corresponding halides of iron and molybdenum.

The catalytic metallo-organic compound comprises a substance or a mixture of substances from the group consisting of simple and complex compounds of an element from the 1st to 3rd groups of the periodic table, including lithium, beryllium, magnesium, zinc, cadmium, and aluminum.

The valences of the aforesaid are linked to the same or different alkyl radicals containing 2 to 16 carbon atoms, which may contain for instance 2 to 4 carbon atoms. In the case of aluminum one valence may be satisfied by halogen or by an alkoxy radical. The polymerization agent obtained by reaction of the transition metal compound and the metallo-organic compound contains, at least at the surface, linkages between metal atoms and alkyl groups.

Representative metallo-organic compounds which can be used include alkyl aluminum compounds such as triethylaluminum, diethyl aluminum monochloride, zinc alkyls and lithium alkyls.

The polymerization agent may be prepared by reacting the transition metal compound and metallo-organic compound in an inert solvent in which the polymerization of the acetylenic hydrocarbon may also be effected. The inert solvent may be a paraffinic or aromatic hydrocarbon. Suitable solvents are the paraffinic hydrocarbons such as, for instance, a light gasoline substantially free of olefinic bonds, n-heptane, iso-octane, and so on. Benzene may also be used.

The solvents selected should be anhydrous, preferably have boiling points below 150° C.

The transition metal compound and the metallo-organic compound may be suspended or dissolved separately in an inert solvent of the same group and the suspensions or solutions then brought together to obtain the polymerization agent. In the polymerization apparatus the polymerization agent is caused to act upon the acetylenic hydrocarbon. The latter and the polymerization apparatus must be dried carefully.

The polymerization of the acetylenic hydrocarbon using these agents is effected at temperatures below room temperature, for example at 0° C., to above room temperatures. Preferably, the polymerization is carried out at a temperature between 20° C. and 80° C., usually between 40° C. and 80° C. Temperatures higher than 100° C. should be avoided, in order to avoid crosslinking of the polymer. When the acetylenic hydrocarbon is in the liquid phase the polymerization may be performed at atmospheric pressure. However, when a gaseous acetylenic hydrocarbon is used, it may be convenient to effect the polymerization under a pressure higher than atmospheric, and to dilute said hydrocarbon with an inert gas in order to avoid the danger of explosions. Thus, for example, when acetylene is to be polymerized, a mixture thereof with such gases as hydrogen, nitrogen or a gaseous saturated hydrocarbon like methane may be used. Any gas may be used as diluent for the gaseous acetylenic hydrocarbon provided it does not react with the polymerization agent and is not one which is polymerized under the polymerizing conditions employed. It is, thus, possible to use, as the starting monomer, acetylene resulting from the pyrolysis of hydrocarbons, such as methane.

The polymerization agent may be prepared in the presence of the acetylenic hydrocarbon to be polymerized. In that event, the transition metal compound and a solution of the metallo-organic compound in the inert solvent may be introduced under an atmosphere of inert gas, such as nitrogen, into the polymerization apparatus, the acetylenic hydrocarbon (which term includes acetylene itself) being then introduced and the polymerization thereof allowed to proceed, preferably with heating to 40 to 80° C.

The high polymers of the acetylenic hydrocarbons produced in accordance with the invention are generally strongly colored as initially obtained. For example, acetylene yields a black polymer, phenylacetylene a yellow to red polymer, ethylacetylene, a polymer which is deep brown in color, and butylacetylene a green polymer.

The polyacetylene obtained by this method is partially soluble in organic solvents, whereas the polymers of the other acetylenic hydrocarbons embraced by the formula given above are generally completely soluble in such solvents as benzene.

The polyacetylene contains a large number of double bonds. This has been determined, for example, by the addition of halogens. By the addition of chlorine to the acetylene polymer suspended in carbon tetrachloride, a chlorinated white polymer is thus obtained, whose composition is near to $(—CHCl—)_n$, that is to the composition of the product which results from a linear polyacetylene by addition of two chlorine atoms to each double bond. The high proportion of double bonds can only be explained by the hypothesis that the molecule consists prevailingly of straight chains of methylidyne groups. The black color and the infrared analysis confirm this hypothesis.

In the case of the polymers of acetylenic hydrocarbons higher in the acetylene series, which are soluble in organic solvents, the number of double bonds present in the polymer is calculated from the hydrogen absorbed when the polymer is subjected to catalytic hydrogenation. It has been determined that the amount of hydrogen absorbed corresponds approximately to the amount which would be expected to be absorbed by linear polymers of those hydrocarbons. It appears, therefore, that the polyacetylene consists prevailingly of methylidyne groups and that the polymers of the other acetylenic hydrocarbons consist of methylidyne groups alternating with groups of the type —CR=.

By polymerization of butyl-acetylene (1-hexyne) a green colored polymer is obtained, which can be transformed, by hydrogenation in the presence of an excess of Raney nickel, at 100° C. and 200 atm., into a saturated polymer. This polymer has an infrared spectrum very similar to the spectrum of the linear head-to-tail polyhexene, obtained from 1-hexene as described in previous patents of the applicants.

When the polymerization agent is one which is highly dispersed in, or dissolved in, the solvent used, as is, for example, the agent prepared from a titanium tetra-alcoholate and the metallo-organic compound, the properties of the polyacetylene obtained are influenced and modified to a remarkable extent. In such cases, a black polymer is obtained, which shows on smooth compact surfaces, a brightness similar to that of metals and, on X-ray examination, diffraction lines which are characteristic of crystalline substances.

The sharpest interference lines in the monochromatic X-ray diagrams of the polymer are due to plane spacings of 3.7 and 2.1 A., which can be attributed to an hexagonal, compact packing of parallel, linear chains of polyacetylene.

This packing appears regular in a direction normal to the chain axis.

The polymeric acetylenic hydrocarbons obtained in accordance with the invention are new products. Due to their pronounced chemical reactivity and, in the case of polyacetylene particularly, a notable absorbing property, these new products of molecular weight above 1000 are useful for numerous purposes. Surprisingly, the polyacetylene has a remarkable reinforcing effect on natural and synthetic hydrocarbon rubbers when it is intimately mixed with them prior to vulcanization.

The reinforcing agent in this case will, through the vulcanization process, chemically combine itself with the rubber.

As the polymers of the present invention are able to chemically absorb groups of an acidic or basic nature, their use in the production of ion-exchange resins may be considered. Articles obtained from these polymers may find application in the electrical field. Their electrical conductivity, in fact, particularly in the case of polyacetylene, is considerably higher than for the previously known hydrocarbon polymers.

The following examples are given to illustrate various presently preferred embodiments of the invention, it being understood that these examples are not intended as limitative.

*Example 1*

7.5 gms. of titanium trichloride and a solution of 5.7 gms. of triethyl aluminum in 425 cc. of benzene are introduced under nitrogen atmosphere into a stainless steel autoclave of 2150 cc. capacity.

Acetylene is then pumped into the autoclave and the mass is heated to 40° C. Since a continuous pressure decrease is observed, further acetylene is slowly pumped into the autoclave until 40 Nl are introduced. About 30 hours after the start of the operation, the unreacted gases are vented and methanol is pumped into the autoclave in order to decompose the metallo-organic compounds present.

The reaction product, which occurs as a black powder suspended in the solvent used, is withdrawn from the autoclave, filtered and purified of inorganic products resulting from decomposition of the polymerization agent by suspending it several times in hot methanol and hydrochloric acid. The polymer is finally filtered, washed with methanol and dried by heating under vacuum. 17 gms. of polymer consisting of a black-brown solid of which only a small portion is soluble in benzene are thus obtained.

*Example 2*

A solution of 11.4 gms. of triethyl aluminum in 200 cc. of n-heptane is introduced into a 1000 cc. 4-neck flask provided with a mechanical stirrer, a thermometer and a dropping funnel, under nitrogen atmosphere. Acetylene is then bubbled into the solution, and a solution of 1.9 gms. of $TiCl_4$ in 50 cc. of n-heptane is added dropwise at a temperature of 20° C. A limited spontaneous temperature increase (7° C.) is observed.

The introduction of acetylene is continued at a flow rate of 3.0 l./hr. while agitating the reaction mixture at 50° C. for a total of 17 hours, after which the reaction mixture consists of the liquid containing in suspension a black powdery solid product.

About 100 cc. of methanol are introduced into the reaction flask in order to decompose the metallo-organic product present. The reaction product is then treated with hydrochloric acid to solubilize the inorganic products resulting from decomposition of the polymerization agent, filtered, washed several times with methanol, and dried by heating under vacuum.

12.5 gms. of a black powdery solid polymer are thus obtained, 40% of which is extractable with hot acetone.

*Example 3*

11 gms. of anhydrous ferric chloride and a solution of 11.4 gms. triethyl aluminum in 500 cc. n-heptane are introduced under nitrogen into a 1750 cc. autoclave. While the autoclave is agitated, the mixture is heated to 40° C. at which temperature acetylene is added in small increments until a total of 15 Nl has been introduced. The unreacted monomer is vented and methanol is pumped into the autoclave. The reaction product is then treated as in Example 1.

5.5 gms. of a black solid product having properties similar to those of the product of Example 1 are thus obtained.

*Example 4*

2.5 gms. of vanadium trichloride and a solution of 11.4 gms. of triethyl aluminum in 500 cc. of n-heptane are introduced under nitrogen atmosphere into a 1750 cc. autoclave. The mixture is then heated, with agitation, to 45° C. and 20 Nl of acetylene are compressed into the autoclave, little by little. The temperature is held between 40° C. and 45° C. for about 20 hours, after which the reaction product is withdrawn and treated as described in the preceding examples.

A solid black polymer having properties similar to those of the products obtained in the foregoing examples are thus obtained.

Example 5

10 gms. of a mixture of 50% MoCl$_3$ and 50% MoCl$_5$, and a solution of 11.4 gms. triethyl aluminum in 500 cc. of heptane are introduced under nitrogen into a 2150 cc. autoclave. The mixture is heated to a temperature between 30° C. and 36° C. for about 20 hours and, little by little, 26 Nl of acetylene are compressed into the autoclave. After said period of time the unreacted gases are vented and the reaction product is treated as already described. 16.5 g. of a black-brown solid polymer are obtained.

42% of the polymer obtained is extractable with hot acetone.

Example 6

A solution of 11.4 g. Al(C$_2$H$_5$)$_3$ in 400 cc. heptane is introduced under nitrogen into a 1780 cc. autoclave. Acetylene is then pumped into the autoclave up to 2 atmospheres and the whole is heated to 27° C. At this temperature a solution of 10 g. (about 0.04 mole) titanium tetra-isopropylate in 100 cc. heptane is injected into the autoclave under nitrogen pressure. The temperature rises spontaneously in a few minutes while a pressure decrease is noted. Further acetylene is then pumped into the autoclave, while keeping the temperature at 50° C.

After 25 Nl of acetylene have been introduced, a solution of 5.5 g. titanium tetra-isopropylate in 70 cc. heptane is injected into the autoclave under nitrogen pressure. Further acetylene is introduced little by little, while at a temperature of 55° C. a continuous pressure decrease is observed.

About 20 hours after the beginning of the operation, a total of 34.0 Nl of acetylene having been introduced into the autoclave, the unreacted monomer is vented and methanol is pumped into the reactor. Finally the autoclave is opened and the reaction product, which occurs as a black solid mass swollen with the solvent, is taken out. Proceeding as described in the preceding examples, 35 g. of a black solid polymer are obtained. By extraction with acetone, this product yields a soluble amorphous fraction and an insoluble fraction which under the X-rays with monochromatic light shows some diffraction lines which can be attributed to the presence of crystalline portions.

Example 7

Two stainless steel balls of 1 inch diameter and a glass vial containing 4 g. titanium trichloride are introduced into a shaking autoclave of 2150 cc. capacity. The autoclave is then filled with nitrogen and a solution of 5.7 g. triethyl aluminum in 250 cc. anhydrous benzene, and 78 g. phenylacetylene are then added. The mixture is heated to 50° C. and the autoclave is put in agitation, causing the vial to break.

The autoclave is kept in agitation for 48 hours at temperatures between 45 and 50° C. After said period of time, heating is stopped, methanol is pumped into the autoclave and the reaction product is taken out. It occurs as a semi-solid mass of a deep orange-red color. The inorganic products deriving from the decomposition of the polymerization agent are removed from the polymer by treatment with hot ether and hydrochloric acid under nitrogen. The polymer is then coagulated completely with methanol, filtered and dried by heating under vacuum. 51 g. of polymer are thus obtained which corresponds to a 65.5% conversion of the monomer employed. About 30% of the product consists of a light yellow, solid polymer soluble in hot acetone. The remaining fraction consists of an orange-red solid product insoluble in boiling ether and boiling heptane but completely extractable with hot benzene. The fraction insoluble in acetone but soluble in benzene shows in tetralin solution at 135° C. an intrinsic viscosity of 0.077 and in toluene solution at 25° C. an intrinsic viscosity of 0.132.

Example 8

4.5 TiCl$_3$ and a solution of 5.7 g. triethyl aluminum in 400 cc. heptane are introduced under nitrogen into a 2150 cc. autoclave. Agitation on the autoclave is started and soon after 50 g. of ethyl acetylene are injected into the reactor under nitrogen pressure. The autoclave is heated, while agitating, up to 52° C. and kept at this temperature for about 14 hours.

Then methanol is pumped into the autoclave and the content of the autoclave is taken out. The product obtained consists of a liquid mass of a dark red color, from which, by addition of a large amount of methanol, a brown-black solid product separates, which is recovered by filtration. This solid product is completely soluble in hot ether and is purified from the inorganic products present by treatment with ether and hydrochloric acid and subsequent complete coagulation with methanol. The polymer is then filtered, washed and dried by heating under vacuum. 5 g. of a brown-black, powdery solid product having an intrinsic viscosity, in toluene at 25° C., of 0.085 are thus obtained.

Example 9

4 g. titanium trichloride, a solution of 5 g. diethyl zinc in 200 cc. anhydrous benzene, and 36 g. phenylacetylene are introduced into a 500 cc. flask provided with a mechanical stirrer. The mixture is kept at 80–85° C. for 3 hours while stirring. After said period, the metalloorganic products present are decomposed with methanol and the reaction product is treated as described in Example 7. 20 g. of a light-yellow, solid polymer similar to that described in Example 7 are thus obtained.

Example 10

A solution of 5.7 g. triethyl aluminum in 200 ml. heptane is introduced into a shaking autoclave of about 2 liters capacity, filled with nitrogen.

12 g. of purified and dried acetylene are then added by means of a suitable pump and the autoclave is heated to 40° C. The solution of 0.02 mole vanadyl isopropylate [VO(OC$_3$H$_7$)$_3$] in 50 ml. heptane is then injected under nitrogen. The temperature goes up to about 10° C. in 20 minutes, while a pressure drop may be noticed. Within approximately 5 hours further acetylene is introduced, in portions, up to a total of 27 g. Methanol is then pumped in the autoclave and the polymerization product is taken out. It is purified from inorganic impurities by treatment with hydrochloric acid. By filtration and drying, 22 g. of a solid black polymer are isolated, in the form of flakes of glittering metallic appearance. The polymer appears crystalline under the X-rays. By vacuum evaporation of the solvents used in the polymerization and purification, 2 g. of oily products of low molecular weight are recovered. The total polymer yield is then 86% of the employed monomer.

Example 11

A solution of 5.7 g. triethyl aluminum in 200 ml. anhydrous benzene, and 30 g. phenyl acetylene are charged under nitrogen into a 500 ml. glass flask, fitted with stirrer, dropping funnel and reflux condenser.

After heating to 55° C., a solution of 5.5 g. titanium tetra-isopropylate in 50 ml. benzene is added dropwise under stirring. The temperature rises spontaneously to about 80° C., while the mixture gets increasingly viscous. After about 3 hours, 50 moles methanol are added and the polymerization product is purified as usual.

After complete coagulation with a large amount of methanol, 21 g. of a poly-phenylacetylene are isolated, 10% of which, while insoluble in boiling acetone, dissolves in benzene at room temperature.

Example 12

A solution of 12 g. aluminum diethylmonochloride in 400 ml. heptane is introduced under nitrogen in a 2080 ml. autoclave, and 20 g. acetylene are pumped in.

While keeping the autoclave in motion, 11 g. of titanium tetra-isopropylate dissolved in 50 ml. heptane are injected at 25° C. In about 25 minutes the temperature rises to 40° C., while the pressure goes down continuously. More acetylene is added, in portions, up to total of 46 gms. while keeping the temperature between 40 and 50° C.

After three hours from the start the unreacted gas is vented and methanol is pumped in the autoclave. After purification in the usual way, 20.5 g. of a solid black polymer are isolated, which appears crystalline under the X-rays. From the employed solvents 2.8 g. of low molecular weight, oily polymers are recovered.

Example 13

3.2 g. titanium trichloride and solution of 5.7 g. triethyl aluminum in 100 cc. heptane are introduced into a 250 cc. glass flask filed with nitrogen and fitted with stirrer, dropping funnel and reflux condenser.

The flask is kept at a temperature of 20–25° C. and a solution of 30 g. 1-hexyne in 50 cc. heptane is added. The mass is stirred for 6 hrs., while the formation of a solid polymer is noticed. After this time the catalyst is decomposed by addition of methanol, and the polymerization product is purified by dissolving it in hot ether acidified with hydrochloric acid, and coagulating it then completely with methanol.

After filtering and drying the precipitate by heating under vacuum, 14 g. of a polymerization product of 1-hexyne are obtained, in the form of a solid of rubbery appearance, completely soluble in hot carbon tetrachloride.

The polymer has an intrinsic viscosity, in tetral in solution at 135° C., of 1.2.

Example 14

A solution of 0.05 mole trihexyl aluminum in 250 cc. heptane is placed in a 2380 cc. shaking autoclave filled with nitrogen. 23 g. of acetylene are then added, and the autoclave is heated under shaking up to 60° C. At this temperature a solution of 0.025 mole titanium tributylate-mono-n-dodecanolate [$Ti(OC_4H_9)_3OC_{12}H_{25}$] in 50 cc. heptane is injected into the reaction mass. The temperature goes up spontaneously to 70° C. while a fall of pressure may be noticed. More acetylene, 26 g., is then added in several portions.

After approximately 8 hrs. from the start, methanol is pumped into the autoclave and the polymerization product is treated as in the previous examples. 29 g. of a black, glittering polymer are isolated, which appears crystalline under the X-rays. By evaporation of the solvents used in the polymerization and purification steps, 5 g. of oily, low molecular weight products are separated.

Example 15

A solution of 0.14 mole amyl lithium in 200 cc. pentane is introduced into a 2000 ml. autoclave in nitrogen atmosphere. An acetylene-nitrogen mixture containing 10 g. acetylene is then pumped in, and the autoclave is heated to 50° C. At this temperature a solution of 0.02 mole titanium tetraisopropylate is added; the temperature goes up, while a fall in pressure is noticed. More acetylene is then added, in portions, up to a total of 18 g. After about 9 hrs., during which a slow, continuous pressure fall is noticed, the polymerization is stopped and the unreacted acetylene is vented. Proceeding in the usual way 7 g. polyacetylene are obtained. Approximately 8% of the product consists of a black polymer, which appears crystalline under the X-rays.

The acetylenic hydrocarbons to be polymerized by the present method and having the formula $CH \equiv CR$ include, in addition to acetylene, methyl acetylene (propyne-1), ethyl acetylene (butyne-1), n-propyl acetylene (pentyne-1), isopropyl acetylene (3-methyl butyne-1), butyl acetylene (hexyne-1), n-amylacetylene (heptyne-1), n-hexylacetylene (octyne-1), n-heptyl acetylene (nonyne-1), n-octyl, n-octyl acetylene (decyne-1), and phenylacetylene, i.e., those alkyl and aryl-substitution products of acetylene in which the 2-position is occupied by hydrogen.

The method of making the polymers of the other acetylenic hydrocarbons which come within the scope of the invention is the same as set forth in Examples 1–12, and the products are of the same type in that they are of high average molecular weight and comprise linear sections of carbon atom chains containing double bonds.

By virtue of the double bonds present therein, the polymers of the acetylenic hydrocarbons produced by the present method are reactive as evidenced by the fact that they can be vulcanized by the conventional methods. The products are useful in the preparation of elastomers.

The overall process, in terms of the polymerization of acetylene, is illustrated in the accompanying flow sheet in which the single FIGURE is a schematic showing of the steps of the embodiment in which the polymerization agent is prepared in the presence of the acetylene.

When the separation of pure polymers is not required, as e.g. when the polymers have to be employed in the preparation of elastomers, the elimination of the catalyst is not necessary. In such cases the purification step may be omitted, and the polymer used as such after filtration, taking care only of decomposing the residual catalyst by washing the product, e.g., with water containing a small amount of a basic substance.

Since it will be apparent that some changes and modifications may be made in practicing the invention without departing from the spirit and scope thereof it is to be understood that it is not intended to limit the invention except as it is defined in the appended claims.

What is claimed is:

1. Unsaturated linear homopolymers of acetylenic hydrocarbons of the general formula $CH \equiv CR$, wherein R is selected from the group consisting of saturated aliphatic hydrocarbon radicals containing 1 to 8 carbon atoms, and the phenyl radical, said homopolymers having a molecular weight above 1000 and consisting of —CH= groups alternating with —CR= groups, wherein R is selected from the group recited above.

2. Poly (ethylacetylene) having a molecular weight above 1000 and containing linear chains.

3. Poly (phenylacetylene) having a molecular weight above 1000 and containing linear chains.

4. Poly (n-butylacetylene) having a molecular weight above 1000 and containing linear chains.

5. Unsaturated linear homopolymers of acetylenic hydrocarbons of the general formula $CH \equiv CR$, said homopolymers having a molecular weight above 1000 and comprising —CH= groups alternating with —CR= groups, wherein R is a saturated aliphatic radical containing 1 to 8 carbon atoms.

6. A process for polymerizing acetylenic hydrocarbons of the formula $CH \equiv CR$, wherein R is selected from the group consisting of hydrogen, saturated aliphatic hydrocarbon radicals containing 1 to 8 carbon atoms and the phenyl radical, to high molecular weight, solid, unsaturated, linear homopolymers having a molecular weight above 1000, which process comprises polymerizing the monomeric acetylenic hydrocarbon by bringing it into intimate contact, at a temperature below 100° C. and in an inert hydrocarbon solvent, with a catalyst prepared by mixing a compound of a transition metal selected from the group consisting of the halides and alcoholates of the transition metals of groups IV, V, VI and VIII, inclusive, of the periodic table, with an alkyl compound of a metal belonging to groups I to III, inclusive, of the periodic table, selected from the group consisting of the metal alkyls and alkyl metal chlorides, and recovering the polymers thus produced.

7. The process according to claim 6, characterized in that the catalyst is prepared from a halide of the transition metal and the alkyl metal compound.

8. The process according to claim 6, characterized in that the catalyst is prepared from an alkoxide of the transition metal derived from an aliphatic alcohol containing up to 12 carbon atoms, and the alkyl metal compound.

9. The process according to claim 6, characterized in that the catalyst is prepared from the transition metal compound and an alkyl aluminum compound.

10. The process according to claim 6, characterized in that the catalyst is prepared from the transition metal compound and an alkyl zinc compound.

11. The process according to claim 6, characterized in that the catalyst is prepared from the transition metal compound and an alkyl lithium.

12. The process according to claim 6, characterized in that the acetylenic hydrocarbon is polymerized in contact with the catalyst at a temperature between 20° C. and 80° C.

13. The process according to claim 6, characterized in that the acetylenic hydrocarbon polymerized is phenylacetylene.

14. The process according to claim 6, characterized in that the acetylenic hydrocarbon polymerized is ethylacetylene.

15. The process according to claim 6, characterized in that the acetylenic hydrocarbon polymerized is n-butylacetylene.

16. The process according to claim 6, characterized in that the acetylenic hydrocarbon brought into contact with the catalyst is mixed with inert gases.

17. The process according to claim 6, characterized in that the catalyst is prepared from the transition metal compound and triethyl aluminum.

18. The process according to claim 6, characterized in that the catalyst is prepared from the transition metal compound and diethyl zinc.

19. The process according to claim 6, characterized in that the acetylenic hydrocarbon is acetylene.

20. The process according to claim 6, characterized in that the acetylenic hydrocarbon polymerized is acetylene, and the catalyst is prepared from the transition metal compound and triethyl aluminum.

References Cited in the file of this patent

UNITED STATES PATENTS

| | | |
|---|---|---|
| 2,255,396 | Sparks et al. | Sept. 9, 1941 |
| 2,309,768 | Herrman et al. | Feb. 2, 1943 |
| 2,440,498 | Young et al. | Apr. 27, 1948 |
| 2,485,454 | Nelson | Oct. 18, 1949 |
| 2,617,789 | McGrew et al. | Nov. 11, 1952 |
| 2,721,189 | Anderson et al. | Oct. 18, 1955 |
| 2,743,264 | Buselli et al. | Apr. 24, 1956 |
| 2,751,628 | Carpenter et al. | June 26, 1956 |

FOREIGN PATENTS

| | | |
|---|---|---|
| 538,782 | Belgium | Dec. 6, 1955 |

OTHER REFERENCES

Tuttle: Buffalo meeting A.C.S., Abstr. of Papers 13M, fall 1942; also, Intersc. Abstr. (A18:334).

Moeller: Inorganic Chemistry, 1953, pp. 103–106 and 122, John Wiley & Sons, Inc., New York.

Grassie: Chemistry of High Polymer Degradation Processes, 1956, pp. 10–12, Butterworths Scientific Publication London.

Staudinger: "Hoch-Molekulare Organische Verbindunger," pp. 16, 17, and 19, Edwards Brothers, Inc., 1943.